(12) United States Patent
Raghuchandra et al.

(10) Patent No.: US 11,946,456 B2
(45) Date of Patent: Apr. 2, 2024

(54) HYBRID POWER PLANT

(71) Applicant: VESTAS WIND SYSTEMS A/S, Aarhus N (DK)

(72) Inventors: Karthikeya Balladi Raghuchandra, Aarhus N (DK); Loránd Demsa, Aarhus C (DK)

(73) Assignee: Vestas Wind Systems A/S, Aarhus N. (DK)

( * ) Notice: Subject to any disclaimer, the term of this patent is extended or adjusted under 35 U.S.C. 154(b) by 468 days.

(21) Appl. No.: 17/267,753

(22) PCT Filed: Aug. 8, 2019

(86) PCT No.: PCT/DK2019/050239
§ 371 (c)(1),
(2) Date: Feb. 10, 2021

(87) PCT Pub. No.: WO2020/030237
PCT Pub. Date: Feb. 13, 2020

(65) Prior Publication Data
US 2021/0317820 A1 Oct. 14, 2021

(30) Foreign Application Priority Data

Aug. 10, 2018 (DK) .......................... PA 2018 70522

(51) Int. Cl.
*H02J 3/38* (2006.01)
*F03D 9/00* (2016.01)
(Continued)

(52) U.S. Cl.
CPC ............... *F03D 9/007* (2013.01); *F03D 9/25* (2016.05); *F03D 80/20* (2016.05); *H02J 3/381* (2013.01);
(Continued)

(58) Field of Classification Search
CPC . F03D 9/007; F03D 9/25; F03D 80/20; F05B 2220/708; Y02E 10/50; Y02E 10/72; Y02E 20/16; H02J 3/381
See application file for complete search history.

(56) References Cited

U.S. PATENT DOCUMENTS

| | | | |
|---|---|---|---|
| 7,932,621 B1 | 4/2011 | Spellman | |
| 2009/0178668 A1 | 7/2009 | Boggavarapu | |
| 2012/0267901 A1* | 10/2012 | Shufflebotham | ........ H02S 10/12 290/1 R |

FOREIGN PATENT DOCUMENTS

| | | |
|---|---|---|
| CN | 102447264 A | 5/2012 |
| WO | 03007455 A1 | 1/2003 |
| WO | 2020030237 A1 | 2/2020 |

OTHER PUBLICATIONS

Danish Patent and Trademark Office 1st Technical Examination of Application No. PA 2018 70522 dated Mar. 4, 2019.
(Continued)

*Primary Examiner* — Lincoln D Donovan
*Assistant Examiner* — Alex W Lam
(74) *Attorney, Agent, or Firm* — Patterson + Sheridan, LLP

(57) ABSTRACT

A power plant comprising: a plurality of photovoltaic (PV) modules arranged in a first and a second region of the power plant, wherein the PV modules in the same region are electrically connected with each other and wherein the PV modules of the first region are electrically connected to a local grid of the power plant via a first converter, and the PV modules of the second region are electrically connected to the local grid via a second converter; and a wind turbine generator (WTG) which is arranged such that the WTG is able to cast a shadow over at least one of the PV modules; wherein the first region and the second region extend in a substantially radial direction away from the WTG such that
(Continued)

at most one of the two regions is at least partially covered by the shadow of the WTG at any time.

19 Claims, 6 Drawing Sheets

(51) Int. Cl.
    *F03D 9/25*     (2016.01)
    *F03D 80/20*     (2016.01)
    *H02S 10/12*     (2014.01)

(52) U.S. Cl.
    CPC ........ *H02S 10/12* (2014.12); *F05B 2220/708* (2013.01)

(56) References Cited

OTHER PUBLICATIONS

Patent Cooperation Treaty International Search Report for Application PCT/DK2019/050239 dated Nov. 10, 2019.
Intellectual Property India, Examination Report under Sections 12 & 13 of the Patents Act, 1970 and the Patent Rules, 2003 for Application 202117007518 dated Aug. 8, 2022.

\* cited by examiner

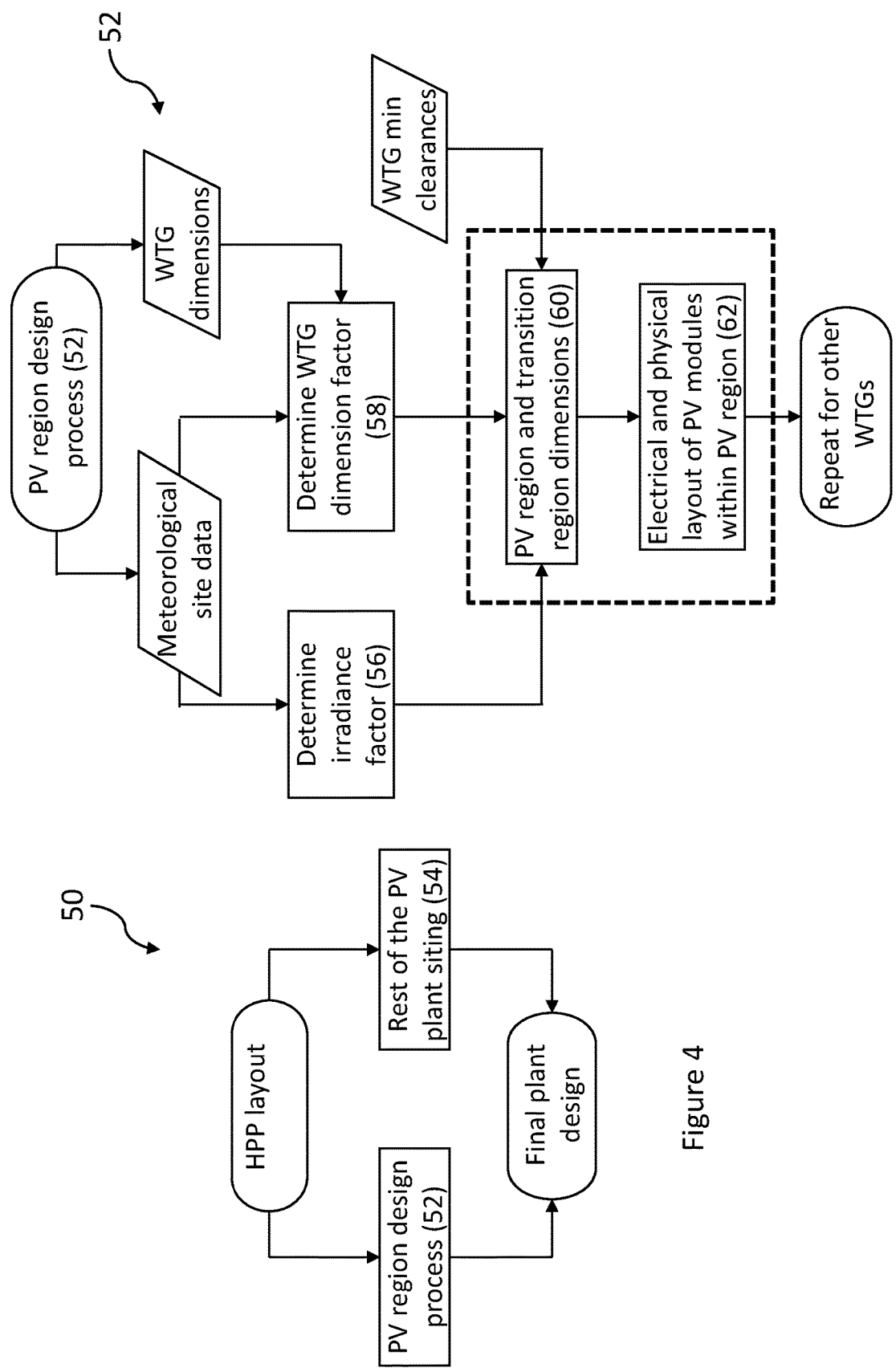

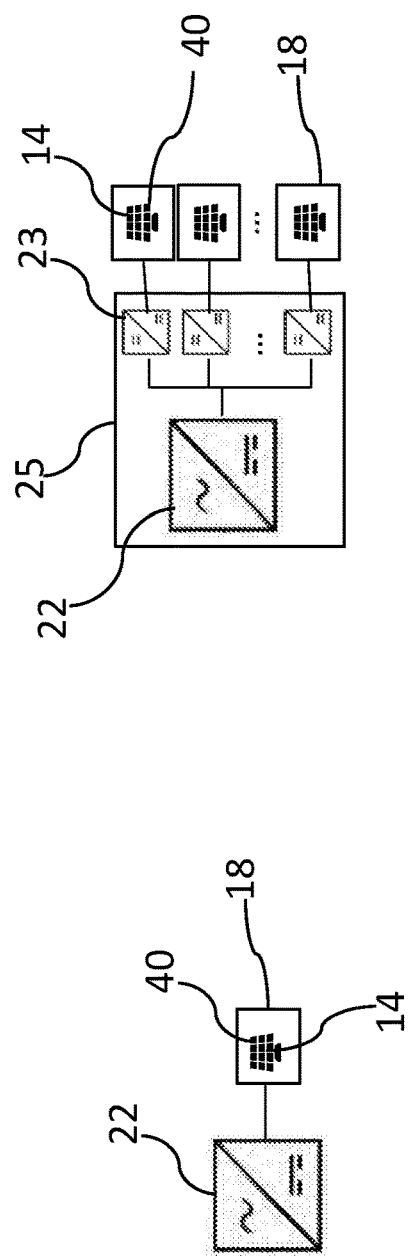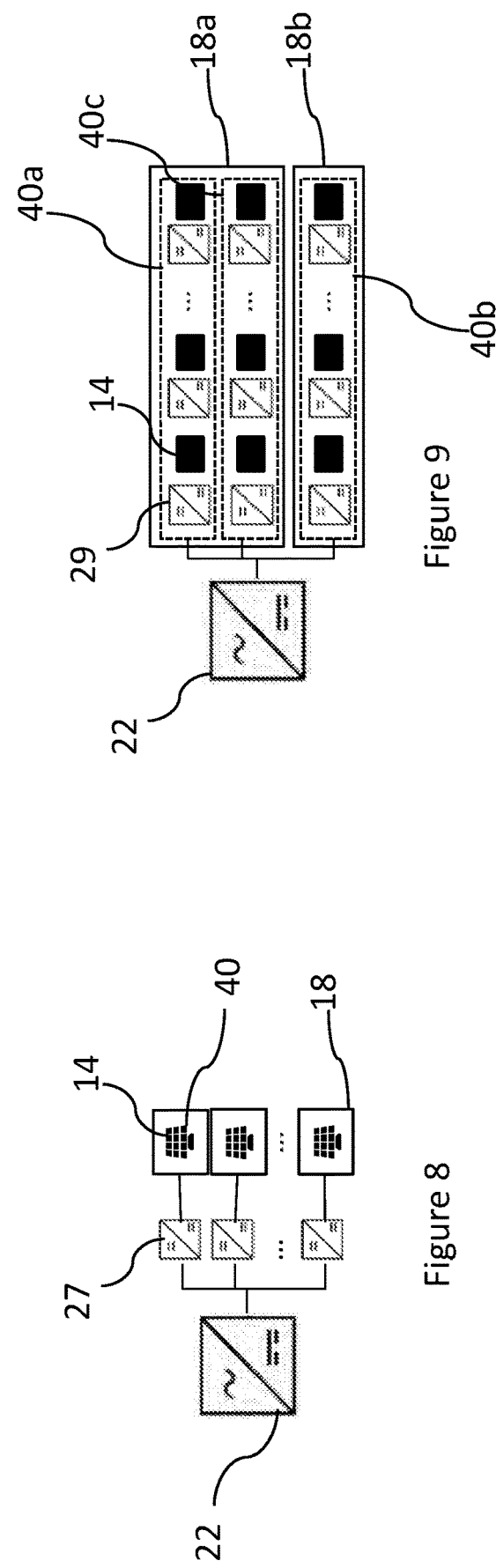

HYBRID POWER PLANT

TECHNICAL FIELD

The present invention relates to a hybrid power plant comprising a wind turbine generator and a plurality of photovoltaic modules. More particularly, the invention relates to a hybrid power plant in which the photovoltaic modules are arranged in dependence of the shading from the wind turbine generator. The invention also relates to a method of constructing a hybrid power plant, a hybrid power plant control system and to a method of controlling a hybrid power plant.

BACKGROUND

It is known to construct power plants which include both wind and solar power generation systems. Such 'hybrid' power plants typically include multiple power generation sites and the electrical power generated at the multiple power generation sites is typically transmitted to a desired location or to a power grid at one or more locations.

A typical hybrid power plant layout includes a wind turbine generator (WTG) arranged together with a plurality of photovoltaic (PV) modules, or panels.

In solar power plants, a plurality of PV modules are generally arranged in an array comprising multiple strings of PV modules. The PV modules in each string are connected together in series whilst the plurality of PV strings are connected in parallel to a converter (or inverter) which converts the direct current (DC) power supply from the PV modules into an alternating current (AC) power supply that can be transmitted to the power grid. In an alternative configuration, the converter is arranged to transform the DC power from the PV modules to a DC power with a different voltage. The different voltage DC power is then transmitted to a DC link, which is arranged within the WTG power converter, before being transmitted to the power grid.

The converter is arranged to apply load characteristics to the PV modules that give the highest power transfer efficiency between the solar array and the utility grid. The load characteristics change to suit the prevailing operating conditions of the PV array using a technique known as the Maximum Power Point Tracking (MPPT). In this way, MPPT is used to maximize power extraction from each of the PV modules under varying operating conditions The co-location of the WTG with the PV modules increases the likelihood of the WTG casting a shadow over the PV modules. A WTG typically includes a large upstanding tower, a nacelle and a plurality of rotor blades, which can cast a long shadow over the array of PV modules.

The tower shadow moves across the PV array as the sun's position changes in the sky throughout the course of a day, thereby shadowing different PV modules at different times of the day. The shadow's position is also affected by the time of year and also the geographical location of the power plant.

Any PV module which is foreshadowed by the tower will experience a drop in the electrical power generation which causes a sub-optimal functioning of the MPPT in the converter. The shadowing from the WTG also causes the PV modules undergo accelerated degradation due to the uneven loading of the PV modules under mismatched irradiance conditions caused by the movement of the WTG's shadow across the PV array throughout the day. The resulting degradation leads to a corresponding reduction in the operating efficiency of the PV modules.

To help maximise the output from the PV power generation system, hybrid power plants located in the Earth's northern hemisphere are configured so that the PV modules are arranged to the south of the WTG, which thereby prevents the shadow from the WTG being cast over the PV modules. Conversely, if the hybrid power plant is located in the Earth's southern hemisphere then the PV modules are arranged to the north of the WTG so as to avoid being overshadowed by the WTG.

Arranging the hybrid power plants in this way results in a correspondingly low space utilization factor, which is typically measured in mega Watts of power generated per square kilometer of land used ($MW/km^2$). A poor space utilization factor increases the cost per unit of power generated which thereby limits the potential profitability of the hybrid power plant over its lifetime. Thus, the number of economically viable locations for such hybrid power plants is limited to areas where there is high solar insolation and/or low cost of land.

It is an aim of the present invention to address disadvantages associated with the prior art.

SUMMARY OF THE INVENTION

According to an aspect of the invention, there is provided a power plant comprising: a plurality of photovoltaic (PV) modules arranged in a first and a second region of the power plant, wherein the PV modules in the same region are electrically connected with each other and wherein the PV modules of the first region are electrically connected to a local grid of the power plant via a first converter, and the PV modules of the second region are electrically connected to the local grid via a second converter; and a wind turbine generator (WTG) which is arranged such that the WTG is able to cast a shadow over at least one of the PV modules; wherein the first region and the second region extend in a substantially radial direction away from the WTG such that at most one of the two regions is at least partially covered by the shadow of the WTG at any time.

The invention enables PV modules to be arranged in a shadow affected area of a hybrid power plant thereby increasing the land utilization of the site on which the power plant is installed. In particular, the arrangement of the PV modules in separate regions which extend radially from the WTG means that, at any given time, the shaded PV modules may be physically and electrically isolated in a pre-defined region so they do not adversely affect the power output from other PV modules in the array.

In this way, the power plant according to the present invention is able to accommodate the shadowing from the WTG in order to limit the degradation of the PV modules that are associated with the WTG shadowing. The invention further increases the power generation capacity of the hybrid power plant by maximising the space utilization factor ($MW/km^2$) which leads to corresponding reduction in the lifetime costs associated with the power plant. In addition, the invention may increase the capacity factor or the power plant.

The power plant according to the present invention comprises different power generation systems, including a WTG and a plurality of PV modules. The power plant may thereby be defined as a hybrid power plant (HPP). The PV modules are located in the same region so that they may be advantageously controlled by the converter in order to counteract the time dependent shading of said region caused by the shadow from the WTG.

The first and second regions comprise PV modules and, as such, may be defined as PV regions of the HPP. The first and second regions define at least part of a shadow affected area of the HPP. The shadow affected area corresponds to an area of the HPP over which the shadow of the WTG may be projected during a particular period.

The first region and the second region extend in a substantially radial direction away from the WTG such that at most one of the two regions is at least partially covered by the shadow of the WTG (12) at any time. Thus, the shadow from the WTG cannot fall on both regions at the same time. In other words, the first region and the second region extend n a substantially radial direction away from the WTG such that the shadow from the WTG, at any time, can only partially cover one of the two regions. It is to be understood that there may be times when both first and the second region is not partially covered by the shadow of the WTG. This could be due to the position of the sun or because the WTG does not case a shadow, e.g. during the night.

The PV modules may be arranged in a substantially annular area around the WTG, the first and the second region correspond to segments of the annular area. The annular area may define the shadow affected area of the HPP. In embodiments, the first and second region may be arranged to form part of a shadow affected area which forms a butterfly like shape comprising two opposing lobe areas.

The shape of each segment may be determined based on the size and shape of the shadow which is caused by the WTG to project upon it during a particular time of the day and/or year.

The shape of each segment may be determined based on the speed with which the shadow passes across the width of the segment. A portion of the WTG shadow which is projected onto a location which is spaced away from the WTG will move quicker across the ground, in a circumferential direction relative to the WTG, compared to a portion of the WTG shadow which is projected closer to the WTG.

The circumferential width of at least one segment of the annular area may increase with increasing distance from the WTG. The circumferential width of each segment may increase with increasing distance from the WTG. The increasing width of a segment conveniently accommodates the different speeds with which the different portions of a WTG shadow will move across the circumferential width of the segment. Advantageously, this reduces the overlap between neighbouring segments and prevents a WTG shadow from projecting over two adjacently arranged regions. This increases the potential control of the PV modules by enabling only PV modules in a given shaded region to be disabled, thereby increasing the lifetime of the PV modules.

Under certain conditions, such as when a segment is arranged close to due north from the WTG when the HPP is located in the Earth's northern hemisphere, the circumferential area of the segment may decrease with increasing distance from the WTG. The narrowing circumferential width of the segment enables it to accommodate a WTG shadow which may narrow as it extends away from a base of the WTG in a substantially radial direction along the length of the segment.

The first and second regions may be separated from each other by a transition region which extends radially from the WTG and between the first and the second regions; the radial transition region may comprise no PV modules. The transition region advantageously separates the first and second region so that there is no overlap between the regions and, therefore, at most one of the two regions is at least partially covered by the shadow of the WTG at any time.

The radial transition region may be configured to allow access for maintenance of PV modules that are arranged adjacent to the radial transition region. The transition region may be dimensioned such that it would allow a maintenance worker, or robot, to inspect and/or repair at least those PV modules which are adjacent to the transition area.

A circumferential width of the radial transition region is configured such that a portion of the shadow due to a tower of the WTG is projected within the radial transition region during a predetermined period of the day. Advantageously, the circumferential width may prevent the WTG tower's shadow from overlapping two adjacent PV regions of the HPP.

A tower of the WTG may be arranged to cast a shadow, during a predefined period, over a portion of the annular area and wherein the second region may be located outside of the shadowed portion of the annular area during the predefined period. The second region may be arranged such that the WTG shadow caused by the tower does not project over the second region during a predefined period.

At least the first region may be arranged, a) when the power plant is installed in the northern hemisphere, substantially north of the WTG, or b) when the power plant is located in the southern hemisphere, substantially south of the WTG.

The power plant may comprise PV modules arranged in a third region, the third region being arranged between the first region and the WTG and wherein the PV modules in the third region are connected with each other.

The shadow of the WTG may comprise a first portion and a second portion, the first portion being due to a nacelle and/or rotor of the WTG and the second portion being due to a tower of the WTG. The first and third regions may be configured such that, during a predefined period of a year, the first shadow portion falls substantially on the first region and the second shadow portion falls substantially on the third region.

In embodiments which comprise a first and a third region, the first region may be separated from the third region by a circumferential transition region extending along a WTG facing end of the first region.

The third region may have a greater area than the first region. The first region may be arranged further away from the WTG compared to the third region such that it may conveniently accommodate a narrowing portion of the shadow caused by the WTG tower.

According to a further aspect of the present invention there is provided a method of constructing a power plant, the method comprising: arranging a plurality of PV modules into a first region and a second region of the power plant, the first and the second region being adjacent to a wind turbine generator (WTG) of the power plant such that the WTG casts a shadow over at least one of the PV modules; and connecting the PV modules within each region together, wherein the PV modules of the first region are electrically connected to a local grid of the power plant via a first converter, and the PV modules of the second region are electrically connected to the local grid via a second converter; wherein the step of arranging the plurality of PV modules comprises arranging the modules to extend the first and the second region in substantially radial directions away from the WTG such that at most one of the two regions is at least partially covered by the shadow of the WTG at any time.

The step of arranging the plurality of PV modules may comprise: determining a WTG dimension factor relating to the size and shape of the WTG: determining an irradiance factor relating to the sun's movement through the sky relative to the WTG's location; and calculating the dimensions of the first and second regions in dependence on the dimension factor and the irradiance factor; wherein the first and second regions may be at least partially covered by the shadow of the WTG during different predefined time periods.

The WTG dimension factor may include shadow-path data comprising information relating to the size and positioning of the shadow which is caused by the WTG at a particular power plant site. The shadow-path date may also describe how the WTG shadow changes throughout the day, and also how it changes over course of a year. The dimension factor may comprise a numeric value which is indicative of the area of a two dimensional projection of the WTG.

The irradiance factor may comprise a numeric value which is indicative of the level of solar irradiance which is received upon the WTG at a particular power plant site. The irradiance factor may comprise relevant sun-path data associated with the proposed site of the power plant. The sun-path data may include information which describes how the level of irradiation at a site changes throughout the day and/or over the course of a year. The irradiance factor may also include data which describes the relative angle of the sun in the sky over particular time periods.

A further aspect of the invention relates to computer software that, when executed, is arranged to perform a method according to any of the previous paragraphs. A yet further aspect of the invention relates to a non-transitory computer readable storage medium storing instructions thereon that, when executed by one or more electronic processors, causes the one or more electronic processors to carry out the method of the previous aspect.

It is to be understood that the mentioned HPP could form a park having a plurality of WTGs where at least some of the WTGs have PV in their shadow affected area. In case of a park the park controller could be used to control all WTGs and PV in the park.

The parameters and instructions associated with the method steps of the invention are provided as electronic data stored on a non-volatile memory component of a computer or logic system embedded within a power plant controller, or WTG controller, of the power plant.

As used herein, the term "controller" will be understood to include both a single controller or control unit and a plurality of controllers or control units collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller.

It will be appreciated, however, that other arrangements are also useful, and therefore, the present invention is not intended to be limited to any particular arrangement. In any event, the set of instructions described above may be embedded in a computer-readable storage medium (e.g. a non-transitory storage medium) that may comprise any mechanism for storing information in a form readable by a machine or electronic processors/computational device, including, without limitation: a magnetic storage medium (e.g., floppy diskette): optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

It will be appreciated that the foregoing represents only some of the possibilities with respect to the particular subsystems of a power plant that may be included, as well as the arrangement of those subsystems with the control unit. Accordingly, it will be further appreciated that embodiments of a power plant including other or additional subsystems and subsystem arrangements remain within the spirit and scope of the present invention. Additional subsystems may include, for example, systems relating to any WTG control function.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 4 is a flow chart governing the design of a hybrid power plant according to an embodiment of the invention:

FIG. 5 is a flow chart governing the design of a segment of the hybrid power plant of FIG. 2;

FIGS. 6 to 9 are schematic views of alternative electrical converter arrangements, according to an embodiment of the invention, used in the hybrid power plant of FIG. 2.

DETAILED DESCRIPTION

In the following detailed description, reference is made to the accompanying drawings which form a part hereof, and which illustrate specific embodiments of the invention. These embodiments are described in sufficient detail to enable those of ordinary skill in the art to make and use them.

Figure 1:
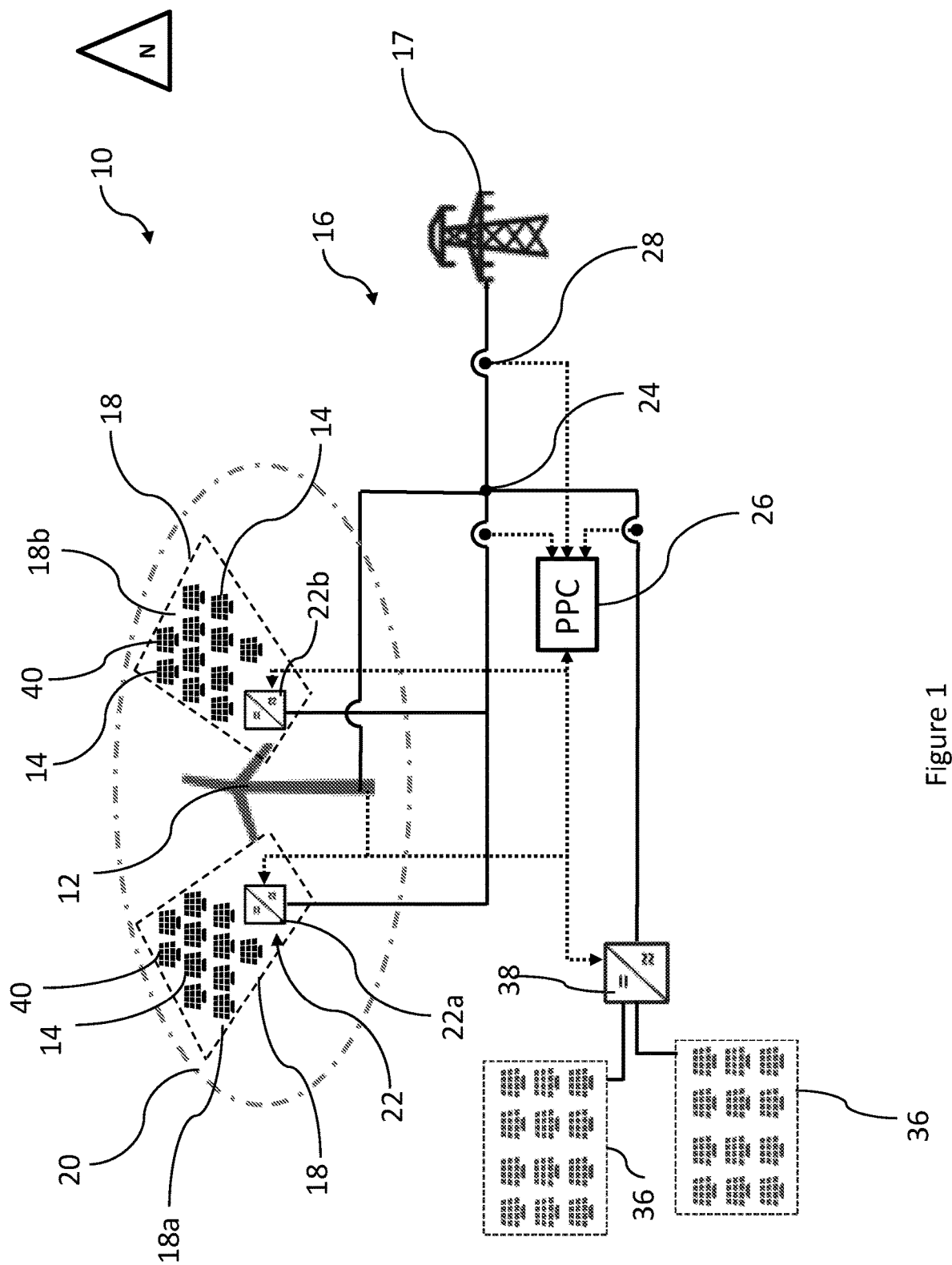
FIG. 1 is a schematic view of a hybrid power plant and its connection to a main transmission grid.

FIG. 1 illustrates a basic architecture of a hybrid power plant (HPP) 10 in which a wind turbine generator (WTG) 12, often more commonly referred to as a 'wind turbine', and a plurality of photovoltaic (PV) modules 14 are electrically connected via a local power network 16 to a main transmission grid 17. The plurality of PV modules 14 are distributed across an area of over which the WTG 12 may cast a shadow at a particular time. This area defines a shadow affected area 20 of the HPP 10.

The PV modules 14 are grouped into discrete PV regions 18. A plurality of PV modules 14 in a given PV region 18 are electrically connected together to define a PV string 40. Each PV string 40 is connected to a converter 22, or inverter, which in turn is connected to the WTG 12 via the local power network 16. The PV modules 14 in each of the PV regions 18 are arranged such that, at most, one of the PV regions 18 is at least partially covered by the shadow of the WTG 12 at any given time. The PV module 14, or panel, comprise a plurality of individual PV cells, which are all connected together in series to generate a common electrical power output.

In an embodiment, each of the PV regions 18 are electrically connected to more than one converter 22 in such a way the converters can convert power from PVs in either regions. This allows the HPP 10 to operate using one fewer converters 22 than the number of PV regions 18. In the example of FIG. 1 where there are two regions only one converter could be used, the converter will then only convert power from the PVs in the region not in the shadow of the WTG.

The shadow of the WTG 12 is projected over different portions of the shadow affected area 20 depending on the time of day, and also the time of year. The shadow affected area 20, is shown as having an ellipse shape centred on the WTG 12 in FIG. 1. As will be explained in more detail below, the shadow affected area 20 may comprise a number of different shapes depending on the size and shape of the shadow from the WTG 12, which is cast over the site of the HPP 10. The PV modules 14 are grouped into a first region 18a and a second region 18b, with each region being situated in the shadow affected area 20. Alternatively, one of the regions 18a, 18b may be situated outside the shadow affected area.

The modules in the first region 18a are connected to a first converter 22a whilst the modules in the second region 18b are interconnected with a second converter 22b. By use of circuit breakers, preferably in the converters, the PV modules corresponding to each first region 18a disconnect with the local power network 16 and hereby be electrically disconnected from the PV modules arranged in the second region 18b. A number of the PV modules of the first region 18a may be connected in series to form a PV string. The PV string may be connected in parallel to the first converter 22a along with at least one further PV string of the first region 18a. Alternatively, all of the PV modules 14 in the first region 18a may be connected in series to the first converter 22a. It will be appreciated that the PV modules 14 of the second region 18b may be connected together in the same manner as PV modules 14 of the first region 18a.

In addition to the PV modules 14 which are arranged in the shadow affected area 20, a separate group of PV modules 14 can be arranged in a forward position relative to the WTG 12, which defines a shadow unaffected region 36 of the HPP 10. The shadow unaffected region 36 may be arranged in any location outside the shadow affected area 20. A pair of shadow unaffected PV regions 36 are each connected to a central converter 38, as shown in FIG. 1. Alternatively, each shadow unaffected region 36 may be provided with a separate converter 38.

In the above described embodiment, the HPP 10 is located in the northern hemisphere of the earth and so the shadow from the WTG 12 is offset towards the north of the WTG 12, because the sun's position in the sky is most of the time south of the WTG 12. Accordingly, the shadow affected region 20 is offset in a northerly direction relative to the WTG 12. The first region 18a and the second region 18b are arranged with respect to the WTG 12 such that, at most, only one of the two regions 18 is at least partially covered by the shadow of the WTG 12 at any given time. It will be appreciated by the skilled person that if the hybrid power plant 10 is located in the Earth's southern hemisphere then the shadow affected region 20 may be offset in a southerly direction relative to the WTG 12.

The HPP 10 is connected to the main transmission grid 17 at a Point of Interconnection (PoI) 24 within the local power network 16. The PoI 24 forms an interface between the local power network 16 of the HPP 10 and the main transmission grid 17. The local power network 16 includes a number of connecting lines (shown as solid lines in FIG. 1) which electrically connect each of the power generating regions together according to the requirements of the HPP 10. The main transmission grid 17 may be an international, national, or regional grid such as the National Grid of Great Britain, for example, and therefore may be required to span distances of up to around 250 km or more. Accordingly, the voltage level of the main grid 17 may be much higher than the voltage level of the local power network 16 of the HPP 10.

The local power network 16 includes a protection system (not shown) to protect individual components in the network from damage during or following extreme operating conditions, including extreme weather events. For example, it is envisaged that at least an appropriate circuit breaker will be included in each connecting line. Hereinafter, it should be assumed that references to components of the HPP 10 being connected or connections between components comprise suitable connecting lines, also referred to as transmission lines, as described above unless it is otherwise indicated.

The regulation and general operation of the HPP 10 is controlled by a power plant control system or controller (PPC) 26. The PPC 26 is connected to the converters 22 and 38 and to the WTG 12 by a series of cables (shown as dotted lines in FIG. 1), such that the PPC 26 can control the electrical output from the plurality of PV modules 14 and the WTG 12 in order to enable the HPP 10 to meet the demands of the transmission grid 17. It will be appreciated that other suitable connection apparatus may be provided to interconnect the PPC 26 and the various components of the HPP 10. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFi™ or ZigBee™ standards (IEEE802.11 and 802.15.4 respectively).

The PPC 26 is also connected to the local power network 16 at a Point of Measurement (PoM) 28, which enables the PPC 26 to monitor the output of the HPP 10 to the transmission grid 17. The role of the PPC 26 is to act as a command and control interface between the various power generation devices (i.e. the PV modules 14 and the WTG 12) and a grid operator or transmission system operator (TSO). The TSO is responsible for indicating the needs and requirements of the transmission grid to the PPC 26. The PPC 26, in its role as command and control interface, interprets the power delivery demands requested of it by a grid operator and manages the WTG 12 and the PV converters 22 in order to satisfy those requirements, whilst taking into account other operative factors such as grid faults and sudden changes in output or measured grid voltage.

The PPC 26 is a suitable computer system for carrying out the controls and commands as described above and so incorporates a processing module, a connectivity module, a memory module and a sensing module. In order to monitor and regulate the output of the HPP 10 and to interpret the power demands correctly, the PPC 26 is connected to the transmission line between the main transformer and the PoI 24.

The PPC 26 is equipped to measure a representative power output that will be supplied to the transmission grid 17 by the HPP 10. In addition, the PPC 26 may also measure parameters of the power output such as a frequency and voltage, as well as reactive power exchange between the HPP 10 and the main grid and the voltage level of the main grid 17. The PPC 26 may compare the measured parameters against specific grid requirements and communicates control commands to specific components of the HPP 10 accordingly. Preferably, the HPP 10 is capable of altering its reactive power output in reaction to commands received from the PPC 26 by changing the operation of the WTG 12 and/or the PV converters 22.

The WTG 12 and the plurality of PV regions 18 each represent a separate power generation site within the HPP 10. The PV modules 14 in each of the first and second regions 18a, 18b generate electrical power as direct current (DC) electricity by absorbing solar radiation. Hence, the converters 22 receive electricity generated by the PV modules 14 as DC electricity which can be amplified or otherwise modified before it is transmitted to the grid 17. The converters 22 convert DC electricity to AC electricity (i.e. the converters 22 operate as inverters), and transmit the AC electricity, via the POI 24, to the main transmission grid 17 under the control of the PPC 26. The converters 22 may also be configured to convert the DC electricity from the PV modules 14 into different voltage DC electricity which is more suitable for transmission within the local power network 16. The different voltage DC electricity may then be inverted to AC electricity, by a central inverter (not shown), before being transmitted to the main transmission grid 17.

Figure 3:
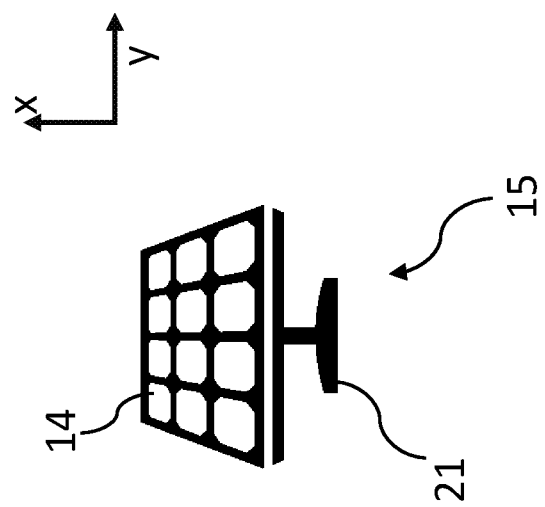
FIG. 3 is a schematic view of a solar power generator, used in a hybrid power plant.

An example arrangement of the PV modules 14 which are used in the HPP 10 according to the present invention are shown in FIG. 3. A plurality of PV modules 14 are mounted on a PV table 15 that comprise a supporting structure 21 which is movable to allow rotation and pivoting of the PV module 14 towards the sun. The PV table 15 has a fixed orientation relative to an axis of rotation which is aligned with an x-direction of the PV table 15. As such, the PV modules 14 are arranged to face towards a substantially southerly direction. The PV table 15 is also fixed about a further axis of rotation which is aligned with a y-direction of the PV table 15. Accordingly, the PV modules 14 are tilted, or pivoted, with an inclination angle of between 0 and 90 degrees towards the equator. As such, an inclination of 0 degrees corresponds to the PV modules 14 being substantially horizontal to the ground and an inclination of 90 degrees represents the PV modules 14 being arranged in a correspondingly vertical orientation.

In FIG. 3, the PV table 15 is shown comprising twelve PV modules 14, arranged in three rows of four PV modules 14. However, it will be appreciated that the PV modules 14 may be arranged in any number of suitable configurations without departing from the scope of the present invention. For example, the PV modules 14 may be arranged in single linear rows or columns arranged across the PV region 18. The PV tables can also include solar trackers which automatically control the PV tables to orientate the PV modules 14 so that they face the incident light from the sun. In order to achieve the required tracking, the PV tables 15 may be configured to track the movement of the sun by enabling rotation of PV table 15 in the x-direction and/or the y-direction. Rotation of the PV table 15 about the x-axis enables the PV modules 14 to track the sun's trajectory through the sky as it moves from east to west during the course of a day. Rotation of the PV table 15 about the y-axis enables the PV modules 14 to also track the parabolic ascent and descent of the sun throughout the day. The PPC 26 may be configured to output control commands to a solar tracking system of the PV table 15 to control the rotation of the PV module 14, about the x-axis and/or y-axis, according to the shading condition of the WTG 12. In this way, the PPC 26 is able to improve the power generation of the PV module 14.

Movement of the PV modules 14 may be controlled manually by an operator of the HPP 10 in order to orientate the PV modules 14 towards the incoming radiation from the sun. The orientation of the PV modules 14 may be achieved through the manual operation of a motorised actuation means; the motorised actuation means being arranged to rotate the PV modules 14. Furthermore, it will be clear to the skilled person that the PV modules 14 may be orientated according to any other suitable orientation means without departing from the present invention.

The WTG 12 converts wind energy into electrical energy, which is transferred from the WTG 12 to the main transmission grid 17 as power, for distribution. The WTG 12 comprises a fixed tower which stands on the ground, and a nacelle which rests on the top of the tower and carries a turbine shaft, a gearbox, a brake and a generator. A plurality of turbine blades is attached to a central hub, which is mounted to the turbine shaft externally of the nacelle. The turbine blades cause the shaft to rotate under the influence of wind, which in turn drives the generator to generate electrical power which is normally provided as alternating current (AC). The electrical power by the WTG is then transmitted to the point of common connection 24 with other power generation sites in the HPP 10. The WTG 12 generates both active power and reactive power as would be readily understood by the skilled person. The WTG 12 may alternatively be configured to output DC power to a DC collector grid (a local network 16). The DC may be converted to AC power before being transmitted to the main transmission grid 17.

The WTG 12 incorporates at least one central processor (not shown) that is configured to monitor the operating status of the WTG 12 to maintain an optimised energy generation, and is also configured to communicate with the PPC 26 and other control systems external to the WTG 12. The central processor is capable of altering the operation of other components of the WTG 12 to effect changes in the reactive and active power output of the WTG 12 in reaction to commands from the PPC 26. The PPC 26 is also supplied with information relating to the operation and monitoring of the WTG 12 by the central processor. The central processor can also include a blade pitch controller which controls the angle of the turbine blades, and a yaw drive which controls the position of the wind turbine relative to the wind.

Figure 2:
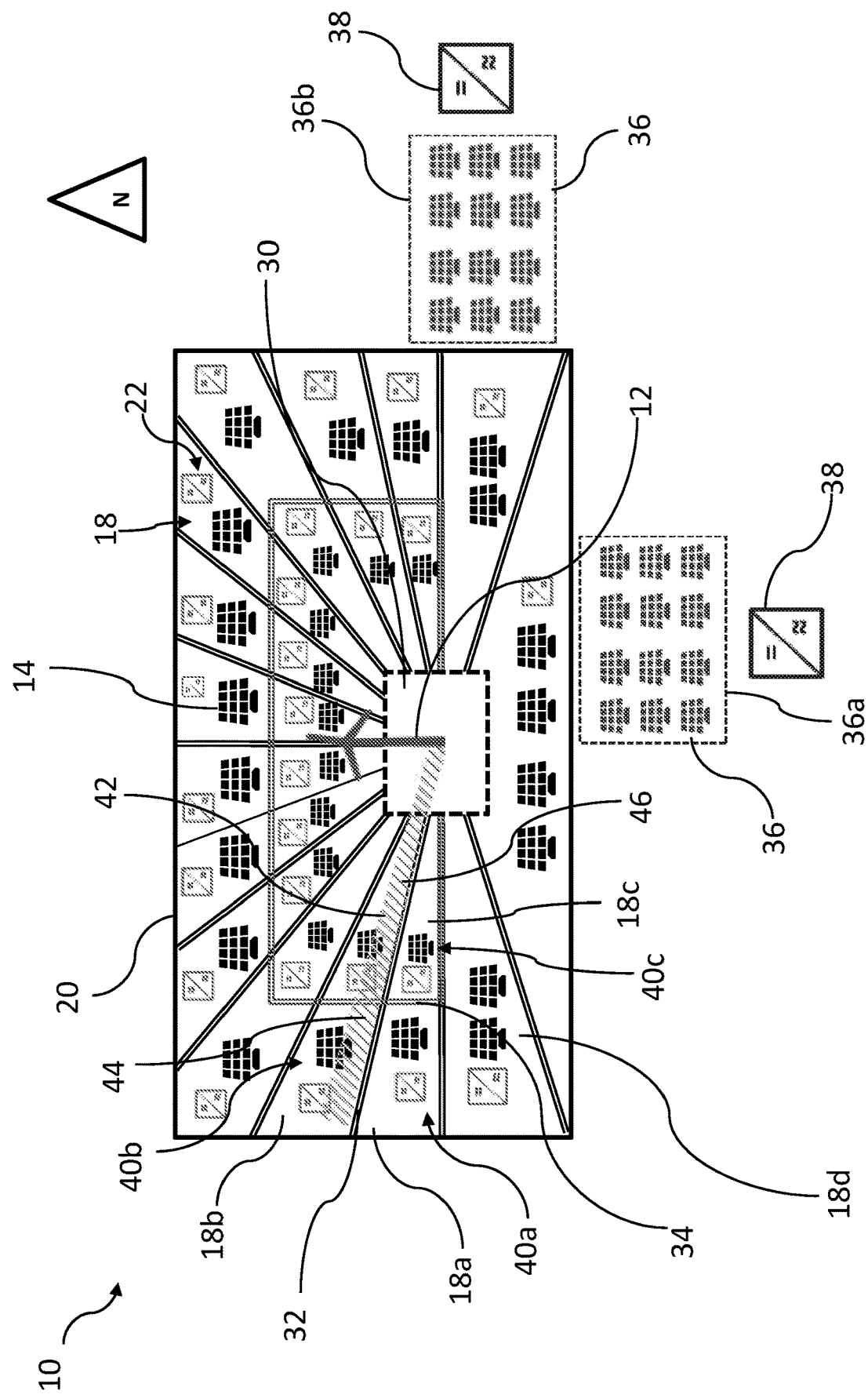
FIG. 2 is a schematic view of a hybrid power plant according to an embodiment of the invention.

With reference to FIG. 2, the layout of the PV regions 18 within the HPP 10, according to an embodiment of the invention, will now be described in more detail. As with the HPP 10 shown in FIG. 1, the HPP 10 comprises a plurality of PV modules 14 arranged in a shadow affected area 20 of the HPP 10. The shadow affected area 20 is divided into a number of discrete PV regions which are centred on the WTG 12. The WTG 12 is arranged such that it is able to cast a shadow over at least one of the PV modules 14 arranged within a PV region 18.

A number of the PV modules 14 are arranged in a first region 18a of the shadow affected area 20. A portion of the PV modules 14 in the first region 18a are electrically connected with each other to define a first PV string 40a. A further set of PV modules 14 are arranged in a second region 18b of the shadow affected area 20. The PV modules 14 in the second region 18b are electrically connected to define a second PV string 40b. The PV modules 14 in each string are connected in series with each other. Each of the first and second regions 18a, 18b may comprise a plurality of the PV strings and the PV strings within each region may be connected to each other in parallel. The first region 18a and the second region 18b extend in a substantially radial direction away from the WTG 12 such that at most one of the two regions is at least partially covered by the shadow of the WTG 12 at any time.

A clearance region 30 defines an area around the base of the WTG 12 in which no PV modules 14 are arranged. The clearance region 30 is located concentrically within the shadow affected region 20 such that the PV regions 18 form an annular area around the WTG 12, wherein the PV regions 18 define segments of this annular area. During operation of the HPP 10, the shadow from tower of the WTG 12 will only cast a shadow over a portion of the annular area during any predefined period and the shadow portion may only partially cover a single segment of the annular area. The first and second regions 18a, 18b are arranged such that, if the segment of the first region 18a is partially covered by the shadow 42, then the segment corresponding to the second region 18a is located outside of the shadowed portion of the annular area. In particular, the circumferential width of each segment of the annular area is arranged to increase with increasing distance from the WTG 12.

A transition region 32 defines a gap between the first and second PV regions 18a, 18b. The transition region 32 extends radially from the WTG 12, and between the first region 18a and the second region 18b. In this way, the radial transition region 32 defines a segment of the annular area in which no PV modules 14 are arranged. The transition region 32 may be provided between each of the neighbouring PV regions 18 within the shadow affected area 20. In particular, the segments corresponding to each transition region 32 are dimensioned so that the WTG shadow 42 will at no time fall on two neighbouring PV regions 18. Furthermore, the transition regions 32 may be used for cable routing between PV modules 14. They may also form access pathways between neighbouring PV regions 18 to allow maintenance of PV modules 14 that are arranged adjacent to the transition region 32.

The PV regions 18 and the transition regions 32 are shaped and dimensioned in such a way that the duration of shadow casting, due to the WTG's shadow 42, over a particular region is precisely calculable for different periods of the day and year. Furthermore, it can be readily determined for which periods the designated regions will be affected by the shadowing from the WTG 12, such that suitable control strategies can be developed to predict when to deactivate each PV region 18. In this way, the PV regions 18 and the transition regions 32 are shaped and dimensioned so that during any time of the day, throughout the year, it is possible to state which of the regions are at least partially overshadowed by the WTG's shadow 42.

The layout of the HPP 10 also makes it possible to state which component of the WTG 12 (i.e. the tower or the nacelle/blades) is causing the shadowing in a particular region. Predicting when, and for how long, a particular region is likely to be foreshadowed makes it easier to perform general maintenance work on the PV modules in those designated regions. Moreover, since the PV modules in each region can be disconnected from the rest of the array, it is also possible to disrupt the cabling in that region without it affecting any other PV region. This makes performing routine maintenance, such as cleaning of the PV modules, much safer to undertake.

A hybrid power plant which is arranged according to the above described layout is able to accommodate the shadowing from the WTG 12 by limiting operating efficiency losses and degradation of the PV modules, whilst maximising space utilization (measured in MW/km$^2$). The increased operating efficiency of the PV modules 14 leads to corresponding reduction in the lifetime costs associated with the HPP 10.

As explained above, a typical WTG 12 includes a nacelle which rests on the top of the tower. Turbine blades are mounted to the nacelle and rotate thereabouts under the influence of the wind. The nacelle can also rotate about a longitudinal axis of the tower in order to position the blades in an optimal position to receive the wind. These movable portions of the WTG 12 can project further and more complex shadows over the PV modules 14 during different periods of the day, and throughout different periods of the year.

Returning to FIG. 2, the power plant includes a group of PV modules 14 which are arranged in a third region 18c within the shadow affected area 20; the third region 18c being arranged between the first region 18a and the WTG 12. The third region 18c is also separated from the first region 18a by a circumferential transition region 34 extending along a WTG 12 facing end of the first region 18a. A number of PV modules 14 in this third region 18c are connected in series with each other to form a third PV string 40c. As with the first and second regions 18a, 18b, the third region 18c may comprise a plurality of the PV strings which may be connected to each other in parallel With reference to FIG. 2, the circumferential transition region 34 extends laterally across the WTG facing ends of the first and the second PV regions (18a, 18b). It will be appreciated by the skilled person that the transition area (34) may be arranged to conform to the shape of the perimeters of two neighbouring PV regions (such as the first and third PV regions 18a, 18c as shown in FIG. 2) in order to provide a buffer zone therebetween.

The shadow 42 of the WTG 12 comprises a first portion 44 and a second portion 46, the first portion 44 being cast by the nacelle and rotor, of the WTG 12, and the second portion 46 being cast by the tower. The first PV region 18a and third region 18c are configured, respectively, such that, during a predefined period of a year, the first shadow portion 44 falls substantially on the first region 18a and the second shadow portion 46 falls substantially on the third region 18c. This separation of the first and third regions 18a, 18c results in a further segmentation of the annular area which is formed around the WTG 12.

The concentrically segregated regions are able to isolate the different portions of shadow casting caused, respectively, by the tower and the nacelle of the WTG 12. This concentric segmentation of the shadow affected regions 20 allows a greater degree of flexibility when controlling the power output of the PV modules 14, as will be described in more detail below.

During use of the power plant, the PV modules in the first region 18a would avoid shadowing throughout a significant percentage of the year. By contrast, the PV modules arranged in the third region 18c would be subjected to shading for most of the year due to shadow which is cast by either the tower or the nacelle of the WTG 12.

A fourth PV region 18d defines a portion of the shadow affected area 20 which is located in front of the WTG 12. The fourth PV region 18d is largely unaffected by the shadow caused by the tower of the WTG 12. However, the PV modules 14 that are arranged in these forward regions may still be overshadowed by the nacelle and the turbine blades of the WTG 12 during the summer months, particularly at midday when the sun is at its highest point in the sky. Although the fourth PV region 18d still experiences shadowing from the WTG 12, the effects of the shadowing on the PV modules 14 is limited due to the inclination of the PV modules 14 away from the WTG 12. Consequently, the fourth PV region 18d is not circumferentially segmented by a transition region 32 like the other PV regions 18 which are arranged substantially rearward of the WTG 12.

In addition to the PV modules arranged in the shadow affected area 20, a separate group of PV modules 14 are arranged in a forward position relative to the WTG 12, which defines a first shadow unaffected region 36a of the HPP 10. A yet further group of PV modules 14 are arranged in a second shadow unaffected region 36b located substantially to the west of the shadow affected area 20. More generally, the HPP may comprise a plurality of shadow unaffected regions, which are arranged in any location which is outside the shadow affected area 20. These shadow unaffected PV regions 36 may each be connected to their own converter 38. These unaffected regions may comprise PV modules 14 that are connected in multiple PV strings 40.

Alternatively, the shadow-unaffected regions 36 may be jointly connected to a central converter 38. It will be appreciated by the skilled person that the shadow unaffected regions 36 can also be arranged to the north and east of the WTG 12 provided they are located outside the shadow affected area 20. In contrast to the PV modules in the shadow affected regions 18, the shape and size of the shadow-unaffected regions 36 are not constrained by the passing of the WTG's shadow 42. Accordingly, a larger converter rating can be chosen for the central converter 38.

FIG. 4 illustrates a flow chart depicting a design method 50 by which the layout of the HPP 10 according to the present invention may be determined. The method 50 is undertaken as part of the construction power plant construction. The method 50 commences with a basic layout of the HPP 10, which incorporates all the relevant architectural parameters of the site including, for example, the number of WTGs 12, the number of PV modules 14 and the arrangement of the associated electrical apparatus.

The method 50 is divided into a first process 52, which is used to determine the arrangement of each PV region 18, and a second process 54, which determines the layout of all the remaining components of the HPP 10. The outcomes of these two separate processes are then combined to produce the final layout of the HPP 10. By separating out the design work associated with arranging the shadow affected PV regions 18, the method 50 of the present invention is able to optimise the utilization of space used by the PV modules 14 with respect to the WTG 12, thereby maximising the power generation capacity of the HPP 10.

The processing steps of the first design process 52 are illustrated in the flow chart shown in FIG. 6. In a first step 56, meteorological data is analysed in order to determine an irradiance factor which relates to the sun's movement through the sky relative to the WTG's location. The irradiance factor comprises relevant sun-path data associated with the proposed site of the HPP 10. The sun-path data also includes information which describes how the level of irradiation at a site changes throughout the day and/or over the course of a year. The irradiance factor also comprises data which describes the relative angle of the sun in the sky over prescribed time periods.

In a concurrent step 58, the same meteorological data is analysed in conjunction with the dimensions of the WTG 12 in order to determine a WTG dimension factor corresponding to the size and shape of the WTG. The WTG dimension factor includes shadow-path data comprising information relating to the size and positioning of the shadow caused by the WTG 12. The shadow-path date also describes how the WTG shadow changes throughout the day, and also how it changes over course of a year.

The shadow-path of the WTG changes throughout the day such that the output from the PV modules 14 in the early morning and late evening is reduced due to the low irradiance from the sun. The output of the PV modules 14 is also affected by the increased shading of the PV modules 14 caused by the longer shadows that are cast by the WTG 12 across the PV array during such periods, due to the reduced elevation of the sun's position in the sky.

The location and the size of WTG's shadow also changes over the course of a year. For example, during the winter months, the reduced elevation of the sun in the sky produces longer shadows which are cast over a narrower range of PV regions 18. By contrast, the shadows in summer are generally shorter and move through a wider range of PV regions 18 because the sun is much higher in the sky and is visible for greater number of hours in the day.

In step 60, the irradiance factor (derived in step 56) and the WTG dimension factor (derived in step 58) are used to determine the dimensions of each PV region and/or transition region. The PV regions 18 are determined such that at most one region is at least partially covered by the shadow of the WTG at any time.

According to the method of step 60, both meteorological and geographical data relating to the site of the HPP 10 (i.e. the site's latitude and elevation above sea level), is used to determine the arrangement of each PV region 18. Consequently, the configuration of the PV regions 18 within any particular HPP 10 is likely to be unique owing to the specific circumstances of the site on which the HPP 10 is to be constructed.

The dimensions of the WTG 12 are also used to determine the shape and relative dimensions of the clearance region 30, which is situated immediately at the base of the WTG 12. The boundary of the clearance region 30 defines the size and shape of the PV regions, as well as defining the minimum area around the WTG 12 in which PV modules cannot be situated.

In step 62, the shadow-path data is used to derive an optimal electrical configuration for the PV modules 14 and converters 22 that comprise each PV region 18. Finally, the method is repeated for PV modules 14 which are arranged around other WTGs 12 of the HPP 10.

The design method 50 described above may comprise a set of instructions which, when executed by a processing means, causes the determination of the architectural layout of the hybrid power plant 10. The set of instructions may be embedded in one or more electronic processors, or alternatively, the set of instructions can be provided as software to be executed by one or more electronic processor(s).

Constructing a hybrid power plant according to the present invention enables improved co-location of Wind and Solar power generation systems (i.e. WTGs and PV modules) leading to a substantial reduction in the electrical Balance of Plant costs (eBoP) associated with reliably integrating such systems into the main transmission grid. The advantageous layout of the HPP also leads to an increase in the yield from the array of PV modules.

A series of exemplary arrangements of the electrical connections provided between the PV modules 14 and converter 22, according to an embodiment of the invention, will now be described in more detail with reference to FIGS. 6 to 9. As explained above, at least some of the PV modules 14 in each PV region 18 are connected, in series, to form a PV string 40.

The PV string 40 is connected to a converter 22. FIG. 6 shows such an arrangement in which a single converter 22 is connected with a PV string 40 such that it defines a string inverter. The string inverter converts the DC electrical supply from the string of PV modules 14 into an AC electrical supply that can be transmitted into the local power network of the HPP 10.

The inverter shown in FIG. 6 comprises an DC/AC converter 22 connected to a PV string 40. The PV string 40 comprises multiple PV modules 14 connected together in series. As explained above, the converter 22 is arranged to control the PV modules 14 that are arranged in the PV string 40. The converter 22 can be arranged to operate a Maximum Power Point Tracking (MPPT) function which allows the converter 22 to control the DC power output from the PV string 40 by ensuring that the open circuit voltage (Voc) from the PV modules 14 is within a predetermined MPPT voltage range corresponding to the efficient operation of the converter 22.

If the Voc is outside the predetermined range, due to shading of one or more PV modules 14 by the WTG 12, then the DC power output from the PV string 40 can be disconnected from the local power network of the HPP 10. Each PV string 40 is connected to a separate converter 22 which is operable to control the output from the PV modules 14 connected therewith. The MPPT function may be carried out by a separate control unit, or controller, which is housed within the converter 22. Alternatively the MPPT function may comprise a set of instructions that can be executed by a central controller of the converter 22.

An alternative arrangement is shown in FIG. 7 in which multiple PV strings 40 are connected to a single inverter assembly 25, in parallel. The converter assembly 25 includes a AC/DC converter 22 connected to a number of MPPT modules 23, in the form of a DC/DC converter. Each MPPT module 23 connects to a single PV string 40 and thereby controls the output from the PV modules 14 connected therewith.

FIG. 8 shows an alternative arrangement in which multiple PV strings 40 are connected to a common DC/AC converter 22 via a separate DC/DC converter 27, also referred to as a DC optimizer. The DC optimizer operates in a similar manner to the MPPT modules describe above, in that they are arranged to control the DC output from each PV string 40. In an alternative arrangement, the DC output the DC optimizer can be connected to a DC collector bus rather than a central converter 22. Where the WTG 12 is configured to supply DC electricity to the local power network 16 (and is, therefore, not provided with its own inverter) then the DC/AC converter 22 associated with the multiple PV strings 40 may be shared with the WTG 12.

A yet further alternative arrangement is shown in FIG. 9 in which a converter 22 is connected to multiple PV strings 40. However, in this arrangement, each PV module 14 is connected within the PV string 40 to the converter 22 via its own micro-converter 29, which controls the DC output from the PV module 14 as per the MPPT modules described above. The PV strings are arranged across two separate PV regions such that two PV strings 40a, 40b are arranged in a first PV region 18a and a further PV string 41a is arranged in a second PV region 18b. Each of the PV strings 40a, 40b and 41c are connected in parallel with the single converter 22. A separate micro-converter 29 can be connected to each PV module 14 or to a group of PV modules 14 mounted to a single PV table 15.

Any one of the converter arrangements shown in FIGS. 6 to 9 may be used to control PV modules 14 connected in a single PV string 40. The PV modules 14 connected in a single PV string 40 are located in the same PV region 18. The PV strings 40 may be comprised of a plurality of PV modules 14 that are mounted to separate PV structures. The arrangements shown in FIGS. 7 to 9 described above employ an intermediate DC optimisation function which is used prior to the DC power being converted to AC power by the inverter. The DC optimisation function, whether it's an MPPT or a separate DC optimizer, is used to dynamically control the output from the PV modules 14 in order to counteract the time dependent shading of the PV region 18 caused by the shadow of the WTG 12.

As a further alternative to the above described embodiments, the PV modules 14 may be connected to the WTG 12 such that the power output from the PV modules 14 are able to utilise the power management hardware provided therein (e.g. the electronic switchgear, transformer, central converter). Alternatively, the converter 22 may be connected to the WTG such that the power output from the converter 22 may be connected to a WTG 12 in order to perform further processing of the electrical power output before transmission to the main transmission grid 17. According to an alternative embodiment, common switchgear may be used within the local power network 16 to control the output of both the PV modules 14 and WTG 12. Alternatively, a common transformer and switchgear may be used. Furthermore, a common transformer, switchgear and converter may be used within the same HPP 10.

Returning to FIG. 1, a control strategy for controlling the output of the PV modules 14 using the PPC 26 will now be described. The PPC 26 controls the first converter 22a, of the first PV region 18a, based on the shading conditions caused by the WTG 12. The PPC 26 is arranged to receive real-time data from the WTG 12 regarding its operation status. The real-time data is indicative of the relative orientation of the nacelle with respect to the tower and/or the relative position of the blades relative to the nacelle and/or the tower.

The PPC 26 is further configured to receive date indicative of the time of the day and month of the year, and to thereby determine the extent of the shadow caused by the WTG 12. The extent of the WTG shadow is characterised by the determined size and shape of the shadow and also the direction in which the shadow is projected for a particularly moment in time.

Alternatively, the PPC 26 may be configured to determine the extent of the WTG shadow based on sensors located at strategic positions across the shadow affected area. Furthermore, the PPC 26 may determine the extent of the WTG shadow based on the power output of an individual PV module 14, or modules.

When the PPC 26 detects that the WTG shadow is shadowing the PV modules 14 of the first PV region 18a, it disconnects the first converter 22a on the DC, the AC or both the DC and AC sides of the converter 22a. This will prolong the operating life of the PV module by avoiding degradation due to operation under shading conditions.

The PPC 26 also outputs reactive power (Q) set-points to the first converter 22a, which has been disconnected from PV modules 14 in the first PV region 18a because of the shading from the WTG 12. Once the first PV region 18a is no longer experiencing WTG shading, then the PV modules 14 are loaded again and the first converter 22a will supply both active (P) and reactive (Q) power set-points.

The PPC 26 is configured to output control commands to the solar tracking system of the PV tables 15 according to the shading condition of the WTG in order to achieve optimal PV power generation.

Figure 10:
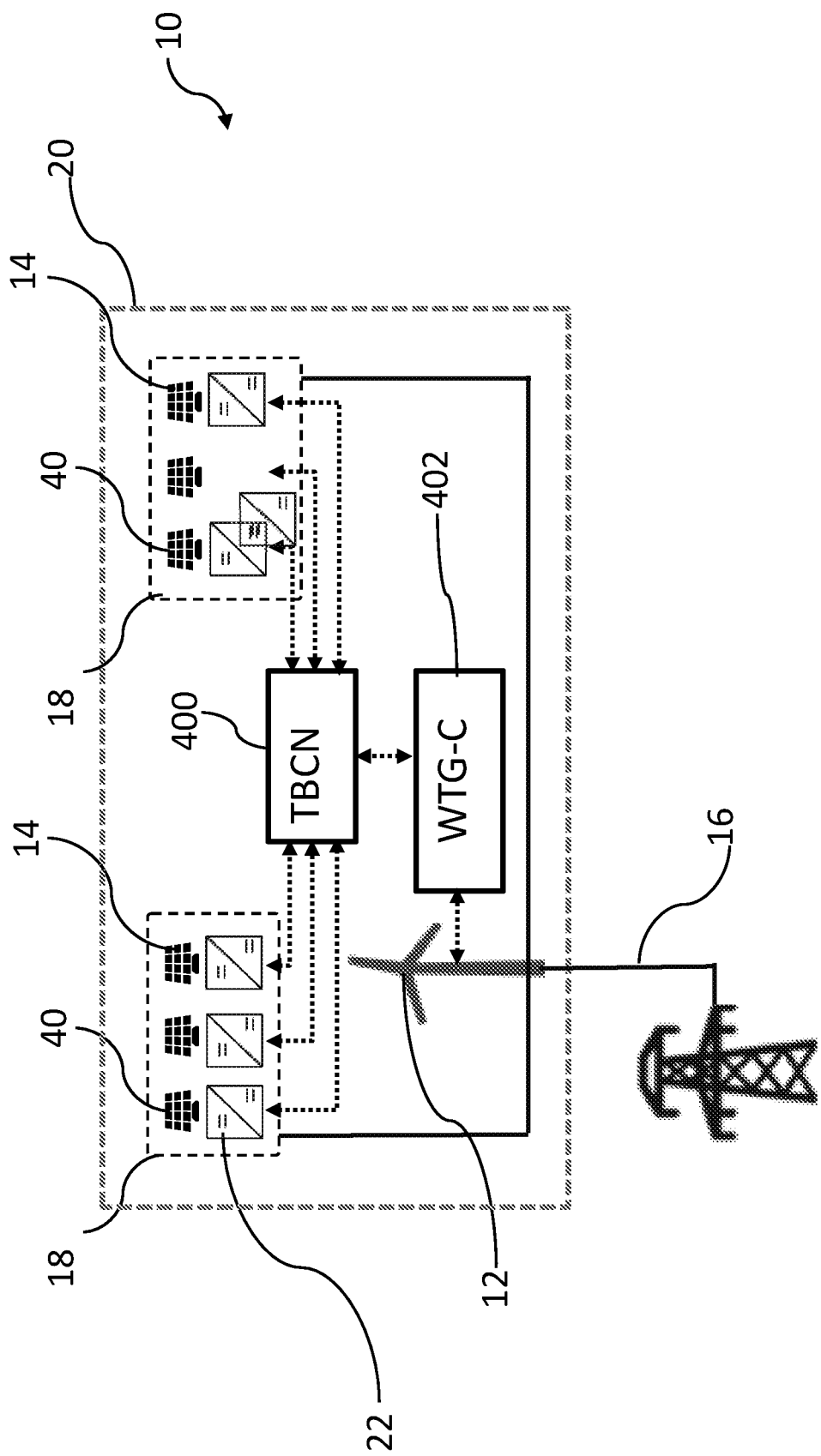
FIG. 10 is a schematic view of the hybrid power plant of FIG. 1, depicting an alternative connection strategy between the power plant components.

In an alternative embodiment of the HPP 10 is shown in FIG. 10 in which the HPP 10 comprises a WTG 12 which is co-located with two PV regions 18 inside a shadow affected area 20 of the HPP 10. In this embodiment, the PV modules 14 and the WTG 12 share common electrical infrastructure. In particular, each of the PV regions 18 comprises multiple PV strings 40 and each PV string 40 is electrically connected via a separate converter 22 to WTG 12. The converter 22 is a DC/DC converter which is electrically connected to the WTG 12. The power supplied from the PVs to the WTG is converted by at least part of the converter of the WTG and in this was supplied to the local power network. Alternatively, the PV strings 40 may be connected directly to the WTG 12 without the need for separate string converters. The converter of the WTG 12 may, depending on the type of local network provide DC or AC to the local power network.

As with the previously described HPP arrangements, the common WTG converter is then connected to the local power network 16 using a set of electrical wires, or cables. The WTG 12 is connected to and controlled by a WTG controller 402, which is operable to control the output of the WTG 12. The WTG controller 402 is also connected to each of the PV string converters 22 via a remote input/output (I/O) device 400 (TBCN), or control node. Through the control node, the WTG controller 402 is also configured to control the output of the PV modules 14 in dependence on the WTG shading condition.

A control strategy for controlling the output of the PV modules 14 using the WTG controller 402 will now be described in more detail. The WTG controller 402 controls at least one converter 22, of a PV region 18, based on the shading conditions caused by the WTG 12. The WTG controller 402 is configured to receive real-time data from the WTG 12 regarding its operational status. The real-time data is indicative of the relative orientation of the nacelle of the WTG 12 with respect to the tower and/or the relative position of the blades relative to the nacelle and/or the tower of the WTG 12.

The WTG controller 402 is further configured to receive date indicative of the time of the day and month of the year, and to thereby determine the extent of the shadow caused by the WTG 12. The extent of the WTG shadow is characterised by the determined size and shape of the shadow and also the direction in which the shadow is projected for a particularly moment in time.

Alternatively, the WTG controller 402 may be configured to determine the extent of the WTG shadow based on sensors located at strategic positions across the shadow affected area 320. Furthermore, the WTG controller 402 may determine the extent of the WTG shadow based on the power output of an individual PV module 14, or modules.

When the WTG controller 402 detects that the WTG shadow is shadowing the PV modules 14 of a PV region 18, it disconnects the corresponding converter 22 that is associated with the PV string 40 in which the PV module 14 is connected. The converter 22 is disconnected on the input or output side (i.e. the DC or AC port if the converter 22 is an inverter, or on either DC port if the converter 22 is a DC/DC converter). This will prolong the operating life of the PV module 14 by avoiding degradation due to operation under shading conditions.

The WTG controller 402 may also outputs reactive power (Q) set-points to the PV converters 22, which have been disconnected from the PV modules 14 in the affected PV region 18 because of the shading from the WTG 12, as the converters can be used to provide reactive power. Once the shadow affected PV region 18 is no longer experiencing WTG shading, then the PV modules 14 are loaded again and the corresponding converter 22 will supply both active (P) and reactive (Q) power set-points.

The examples described herein are representative only and the skilled reader will appreciate other specific architectures are possible. Moreover, the components of the hybrid power plant and the power network are conventional and as such would be familiar to the skilled reader. For example, the diagram of FIG. 2 should be taken as a representation of an exemplary HPP, only. Alternative configurations of HPPs are known and it is expected that other known components may be incorporated in addition to or as alternatives to the components shown and described in FIG. 2. Such changes would be within the capabilities of the skilled person. In particular, additional substations or transformers would be expected to be incorporated in the HPP depending upon the number of PV modules and WTGs included in the HPP.

Many modifications may be made to the above examples without departing from the scope of the present invention as defined in the accompanying claims. For example, although the system is depicted here as applying to a hybrid power plant comprising a plurality of PV modules and a WTG, it is possible to apply the system to a solar PV power plant which is arranged relative to any other structure which casts a shadow over the array of PV modules during their operation. It will also be appreciated by the skilled person that the each of the DC/AC converters described above can be arranged to output AC electrical power with either a 1 phase or 3 phase supply.

The invention claimed is:

1. A power plant comprising:
  a plurality of photovoltaic (PV) modules arranged in a first and a second region of the power plant, wherein the PV modules in the same region are electrically connected with each other, and wherein the PV modules of the first region are electrically connected to a first converter and to a local grid of the power plant via the first converter, and the PV modules of the second region are electrically connected to a second converter and to the local grid via the second converter, and wherein the PV modules of the first region are electrically isolated from the PV modules of the second region; and
  a wind turbine generator (WTG) which is arranged such that the WTG is able to cast a shadow over at least one of the PV modules;

wherein the first region and the second region extend in a substantially radial direction away from the WTG such that at most one of the two regions is at least partially covered by the shadow of the WTG at any time.

2. The power plant according to claim 1, wherein the PV modules are arranged in a substantially annular area around the WTG, the first and the second region corresponding to segments of the annular area.

3. The power plant according to claim 2, wherein a circumferential width of each segment of the annular area increases with increasing distance from the WTG.

4. The power plant according to claim 2, wherein the first and second regions are separated from each other by a transition region which extends radially from the WTG and between the first and the second region.

5. The power plant according to claim 4, wherein the transition region is configured to allow access for maintenance of PV modules that are arranged adjacent to the transition region.

6. The power plant according to claim 4, wherein a circumferential width of the transition region is configured such that a portion of the shadow due to a tower of the WTG is projected within the transition region during a predetermined period of a day.

7. The power plant according to claim 2, wherein a tower of the WTG is arranged to cast a shadow, during a predefined period, over a portion of the annular area and wherein the second region is located outside of a shadowed portion of the annular area during the predefined period.

8. The power plant according to claim 1, wherein at least the first region is arranged, a) when the power plant is installed in the northern hemisphere, substantially north of the WTG, or b) when the power plant is located in the southern hemisphere, substantially south of the WTG.

9. The power plant according to claim 1, wherein the power plant comprises PV modules arranged in a third region, the third region being arranged between the first region and the WTG and wherein the PV modules in the third region are connected with each other.

10. The power plant according to claim 9, wherein the shadow of the WTG comprises a first portion and a second portion, the first portion being due to at least one of a nacelle or rotor of the WTG and the second portion being due to a tower of the WTG;
wherein the first and third regions are configured such that, during a predefined period of a year, the first portion falls substantially on the first region and the second portion falls substantially on the third region.

11. The power plant according to claim 9, wherein the first region is separated from the third region by a circumferential transition region extending along a WTG facing end of the first region.

12. The power plant according to claim 9, wherein the third region has a greater area than the first region.

13. A method of constructing a power plant, the method comprising:
arranging a plurality of photovoltaic (PV) modules into a first region and a second region of the power plant, the first and the second region being adjacent to a wind turbine generator (WTG) of the power plant such that the WTG casts a shadow over at least one of the PV modules; and
connecting the PV modules within each region together wherein the PV modules of the first region are electrically connected to a first converter and to a local grid of the power plant via the first converter, and the PV modules of the second region are electrically connected to a second converter and to the local grid via the second converter, and wherein the PV modules of the first region are electrically isolated from the PV modules of the second region;
wherein the step of arranging the plurality of PV modules comprises arranging the modules to extend the first and the second region in substantially radial directions away from the WTG such that at most one of the two regions is at least partially covered by the shadow of the WTG at any time.

14. The method according to claim 13, wherein the arranging the plurality of PV modules comprises:
determining a WTG dimension factor relating to a size and shape of the WTG;
determining an irradiance factor relating to the sun's movement through the sky relative to a location of the WTG; and
calculating the dimensions of the first and second regions in dependence on the WTG dimension factor and the irradiance factor;
wherein the first and second regions are at least partially covered by the shadow of the WTG during different predefined time periods.

15. The method according to claim 13, wherein the PV modules are arranged in a substantially annular area around the WTG, the first and the second region corresponding to segments of the annular area.

16. The method according to claim 15, wherein a circumferential width of each segment of the annular area increases with increasing distance from the WTG.

17. The method according to claim 13, wherein the first and second regions are separated from each other by a transition region which extends radially from the WTG and between the first and the second region.

18. The method according to claim 17, wherein the transition region is configured to allow access for maintenance of PV modules that are arranged adjacent to the transition region.

19. An arrangement of photovoltaic modules, comprising:
a first plurality of photovoltaic modules arranged in a first region of a power plant; wherein the first plurality of photovoltaic modules are electrically connected to:
each other; and
a first converter and to a local grid via the first converter; and
a second plurality of photovoltaic modules arranged in a second region of the power plant; wherein the second plurality of photovoltaic modules are electrically connected to:
each other; and
a second converter and to the local grid via the second converter; and
wherein the first region and the second region extend in a substantially radial direction away from a wind turbine generator (WTG) such that at most only one of the first region and second region is at least partially covered by a shadow of the WTG at any time, and
wherein the PV modules of the first region are electrically isolated from the PV modules of the second region.

* * * * *